United States Patent [19]

Slaten

[11] Patent Number: 4,500,392
[45] Date of Patent: Feb. 19, 1985

[54] STAMPER AND METHOD FOR INJECTION MOLDING INFORMATION BEARING MEMBER

[75] Inventor: Gary G. Slaten, Tucson, Ariz.

[73] Assignee: Discovision Associates, Costa Mesa, Calif.

[21] Appl. No.: 611,049

[22] Filed: May 16, 1984

Related U.S. Application Data

[62] Division of Ser. No. 505,565, Jun. 17, 1983.

[51] Int. Cl.³ ............................ C25D 1/10; C25D 1/20
[52] U.S. Cl. ................................................... 204/5
[58] Field of Search ..................... 204/5, 51, 6, 38 B

[56] References Cited

U.S. PATENT DOCUMENTS 2,758,961  8/1956  Kosowsky ............................... 204/5
4,305,795  12/1981  Weaver .................................... 204/5
4,402,798  9/1983  Gorog ...................................... 204/5

OTHER PUBLICATIONS

Metal Finishing Guidebook Directory, vol. 77, No. 13, Jan. 1979, pp. 188-190.

Primary Examiner—Thomas Tufariello
Attorney, Agent, or Firm—Ronald J. Clark

[57] ABSTRACT

An improved stamper and method involved in the replication of optically-readable information bearing members by means of an injection molding process utilizing a stamper having a conformal layer of chromium electrolytically deposited over the encoded surface of an existing optically-readable information bearing nickel stamper. Nickel stampers produce replicas having structural and optical defects affecting playability of the replica. The present invention provides improvement in the reduction or elimination of "plowing" and "orange peel" defects through cleaner release at the interface of the master stamper and the stamped article. The invention involves an improved stamper surface comprised of a thin layer of chromium metal deposited over an existing nickel stamper. Such a surface insures a cleaner release at the interface of the master stamper and stamped article.

8 Claims, 19 Drawing Figures

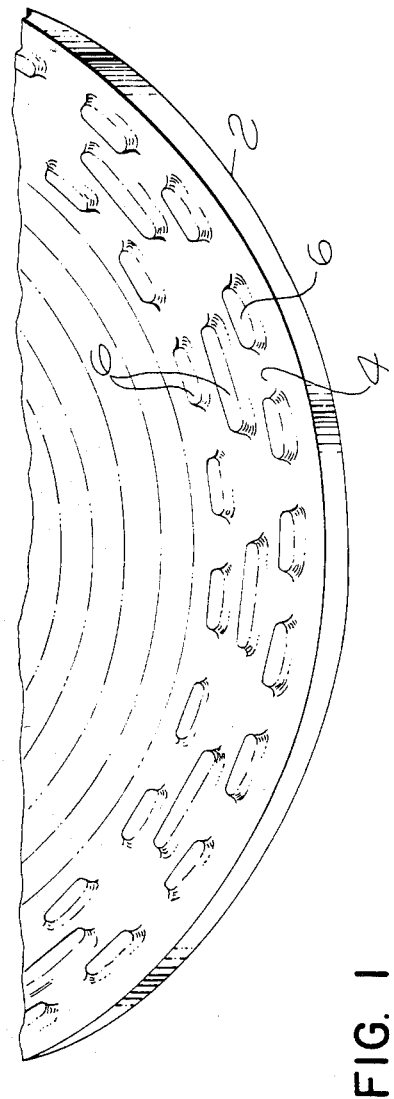
FIG. 1
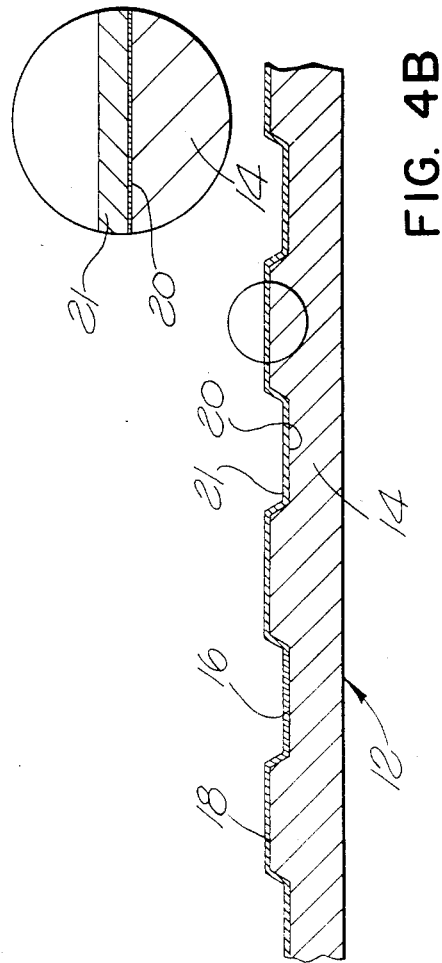
FIG. 4A
FIG. 4B

STAMPER AND METHOD FOR INJECTION MOLDING INFORMATION BEARING MEMBER

This is a division of application Ser. No. 505,565, filed June 17, 1983.

BACKGROUND OF THE INVENTION

1. Field of the Invention

The present invention relates to the field of metal stampers for use in the replication of optically-readable information bearing members. More specifically, the invention is involved in the replication of optically-readable information bearing members by means of an injection molding process utilizing a stamper having a conformal layer of chromium electrolytically deposited over the encoded surface of an existing optically-readable information bearing nickel stamper.

While the improved stamper according to the present invention and the method for making such improved stamper can be used in connection with the production of plastic information bearing surfaces in which micron-sized surface discontinuities are formed in any geometrical configuration, for ease of understanding the devices of the prior art and the invention will be explained using a disc-shaped information bearing member as exemplary. Since the improvement over prior art methods involves the characteristics of the interface between the stamper and the plastic, it will be appreciated that the concepts of the invention broadly apply to the injection molding of information bearing plastic articles of virtually any geometrical shape.

2. Description of the Prior Art

Replication of optically-readable information bearing members by an injection molding process in plastic is well known in the art. Such a process involves liquid plastic injected into a disc-shaped mold and pressed between an encoded stamper surface of nickel (bearing audio, video, and/or digital information) and a rigid backplate. The liquid plastic is allowed to harden and to cool, and is then subsequently "released" from the encoded nickel surface.

Typically, the prior art employs the use of nickel as the stamper material because of its innate structural qualities: a sufficient hardness to bear the fatigue in the mold and release phases of the injection molding process; the considerable ease with which nickel metal can be electrolytically deposited in large amounts; the relatively low cost for the material; and the wide tolerable range of process controls and parameters.

A process for producing a stamper for video-disc purposes is the subject of U.S. Pat. No. 4,211,617, issued July 8, 1980 in the name of Csaba K. Hunyar, assigned to the assignee of the present invention. Hunyar proposes a multi-layer stamper comprised of copper and nickel. The metal layer is applied by vapor bombardment, vapor deposition, or deposition from an electroless plating solution. A "matrix" surface containing the originally recorded information is first silver-plated with an electroless process similar to that used for producing mirror surfaces. The silver film is deposited only to a thickness sufficient to support electroconductivity, typically from about 0.01 to about 2 mils, so that the next electroplating step can be undertaken. The nickel and copper conforming layers are then deposited by an electroplating process to a thickness of from about 3 to 20 mils total thickness, the final layer against which the plastic is molded being the nickel layer.

Upon visual inspection, replicas prepared from a nickel stamper may exhibit glowing orange patches when observed in transmitted light which have the appearance of "surface stains" and which are generally attributed to a surface distortion phenomenon referred to as the "plowing effect" that occurs during the injection molding process. The term "plowing" was coined after observing microphotographs of the surface discontinuities of the replicas and noting that the "bumps" defining the information track thereon were cut away as if by plowing or as if the "bumps" had collided with a sharp object. Subjecting discs prepared from a nickel stamper to various unique tests (to be described in greater detail hereinafter) indicates a direct correlation between the visibly observable "plowing effect" and disc information reproduction quality.

By monitoring various electronic signals as a laboratory disc test player is operated in modified play and scan modes, it is possible to create maps bearing information related to the extent and intensity of surface defects. Such maps plot defective areas with black dots varying in intensity, determined by the magnitude of the defect. Although such "electronic" testing correlates generally with visual inspection, obviously the "electronic" test results are more representative of actual surface defects. In this description plots or maps which are produced by displaying results of "electronic" testing will be termed "electronic interpretations" as contrasted to, for example, visual observations. Electronic interpretations produced by inspecting replicas prepared in a nickel stamper, exhibit distinct darkened regions in and around the "plowed" areas as confirmed by the above-noted visual inspection. These darkened areas correlate precisely with corresponding regions on the disc that exhibit increased audio noise, increased audio crackle and increased numbers of FM drop-outs. The "audio noise" analysis is performed by analyzing the recovered audio signal in a scan mode of the test disc player; "audio crackle" is an analysis evaluating the audio signal recovered during standard play mode; and "FM drop-outs" involve a measurement of the number of times and position on the disc that the recovered FM signal is interrupted.

Visual and electronic inspection of replicas formed against nickel stampers also reveal the presence of an "orange peel" effect within part of the most strongly "stained" areas. The term "orange peel" is descriptive of the appearance of the outer surface of an information storage disc through which a reading light beam must pass before reaching an information-containing surface. The rough-looking, but uniform, surface defect has the visual appearance of the skin surface of an orange. "Orange peel" causes changes in the refraction coefficient from point to point on the disc surface and results in greater loss of tracking. The possibility has been suggested that audio crackle might arise out of an interaction between the "plowing" and the "orange peel". On close inspection, the "orange peel" effect is seen to be slightly inside the radius of the "stained" or "plowed" region at which audio crackle and FM dropouts are more prominent.

Thus, "orange peel" and "plowing" are deleterious by-products of the replication process for producing optically-readable information bearing members formed with nickel stampers. Accordingly, there is a need in the art for improved audio-visual quality of optically readable information bearing members, and the present invention fills this need in the reduction or elimination of "plowing" and "orange peel" through cleaner release at the interface of the master stamper and the stamped article.

SUMMARY OF THE INVENTION

The present invention substantially overcomes all of the deficiencies of the prior art noted above by providing an improved stamper resulting in increased signal quality and increased replication yield of optically-readable bearing members, through the elimination of deleterious surface defects resulting from the injection molding replication process.

More specifically, the present invention provides a method and means for improving the "release" characteristics attributed to the stamper surface in the injection molding process, resulting in increased recovered signal quality and increased stamper yield through the reduction of stamper related defects.

In simplest terms, the invention involves an improved stamper surface comprised of a thin layer of chromium metal deposited over an existing nickel stamper. Such a surface insures a cleaner release at the interface of the master stamper and stamped article.

In a preferred embodiment, the chromium surfaced stamper is an encoded disc-shaped surface which bears audio/video/digital information onto which liquid plastic is formed, hardened, cooled, and released during the injection molding process. Chromium, by its innate structural characteristics, provides a much harder and smoother stamper surface than that of nickel used in the prior art, resulting in the elimination of the particular pit or bump deformation known as the "plowing effect" which is believed to be caused by the differential shrinkage of the hardening plastic as it is formed against the encoded stamper surface.

Prior to any intense study to find a cure for the "plowing effect" which, before the present invention was a defect known to have a negative effect on playability, it was decided to use a chrome surfaced stamper solely for the purposes of extending the life of each stamper because of the increased hardness of chromium over nickel. It was also conceived that such improved hardness may permit the production of a great number of submasters made from the same original master when considering large quantities of replicas having the same program material.

It was after producing replicas from the first hardened, i.e. chrome plated, nickel stamper that the surprising additional benefits in the improvement of quality of signal recovery was noticed. Comparative testing led to a correlation between signal improvement and lack of "plowed" regions on the replicas. More surprising was the observation that the actual signal recovered upon playback of the replica made against a chrome plated stamper was better than that recovered from a replica made against the original nickel stamper before plating, in spite of the fact that microphotographs showed a definite loss of definition of the surface discontinuities defining the information content. Although contrary to what would be expected, it was conjectured that the type of loss of definition that the thin chrome coating produced, especially in the elimination of sharp edges and abrupt surface changes, permitted more uniform shrinkage of the hardening plastic and avoided plowing of the edge of the surface discontinuities during hardening and releasing of the hardened replica from the stamper surface. Further testing showed that improved yield could be obtained from a chrome plated stamper than with the same stamper before chrome plating. That is, surprisingly, chrome plating could render usable an otherwise "defective" stamper, i.e. a stamper which produced defective replicas.

In this connection, it would appear that in an effort to create exactly defined bumps or pits, the artisan unknowingly caused "plowing" to be more prominent resulting in lower yields. On the other hand, adjusting process controls to purposely reduce definition in the original nickel stamper causes other problems, such as incomplete or inconsistent formation of bumps or pits, decreased signal-to-noise ratio, and inconsistent duty cycle of the recorded information. The chrome plating of a well defined nickel stamper information bearing surface, however, produces optimum results for all of these parameters. In such a case, the "exactly defined" bumps or pits of the original nickel stamper are uniquely modified by the chrome plating process to retain the definition needed for consistent duty cycle and good signal-to-noise figures while at the same time avoiding the problems associated with the "plowing effect".

Electronic dot maps produced from the aforementioned procedure, show no indication of the plowing effect with the use of the chromium surfaced stamper as was prominent in the use of prior art nickel stampers. The plowing effect of nickel stampers has been attributed to the hindering of a uniform flow of liquid plastic over the nickel stamper surface and the generating of an undesirable adhesive effect between the stamper and the stamped article. Replicas produced by chromium surfaced stampers exhibit a substantial decrease of audio noise, audio crackle, FM drop-out, and show little or no signs of "orange peel", thereby resulting in an increased audio/visual/digital information quality of the recovered signal.

In addition to plowing reduction, chrome plated stampers offer increased acid (finger print) resistance and possess the ability to be easily cleaned when soiled as compared to nickel surfaced stampers.

Chromium surfaced stampers produce a higher replica yield than that attributed to nickel stampers, not only in the number of playable discs which result, but also in the reduction of wear and surface defects attributed to the harder chromium surface subjected to repeated replication of stamped articles under high pressure and heat. The present invention thus provides an increased stamper life as compared to the prior art as a result of the chromium outer surface of the stamper being of a harder and thus more durable metal than nickel.

BRIEF DESCRIPTION OF THE DRAWINGS

FIG. 1 is an exaggerated and magnified view of the information bearing surface of an optically-readable disc or stamper;

FIG. 4 is an enlarged drawing of the thin layer of chromium metal deposited over an existing nickel stamper;

DETAILED DESCRIPTION OF THE PREFERRED EMBODIMENTS

The process by which prior art stampers were produced begins with a ¼ inch disc-shaped plate of glass onto which a thin layer of photoresist is applied. A laser beam then encodes information onto the layer of photoresist by selectively exposing the photoresist, and after developing, the layer exhibits recorded information in the form of microscopic pits. A minute layer of nickel a few Angstroms thick is vacuum deposited onto the encoded surface. Additional nickel is then electrolytically deposited over the vacuum deposited nickel layer to a sufficient thickness to bear the pressures encountered in the injection molding process. The glass plate is separated from the nickel, exposing the encoded nickel surface which appears as tracks of microscopic bumps approximately 0.6 microns wide and approximately 0.6 to 2 microns in length projecting from a planar base surface. This is schematically illustrated in the exaggerated and magnified drawing of FIG. 1 in which a disc 2 has a planar base surface 4 from which projects a series of bumps 6 defining circular tracks.

Figure 2:
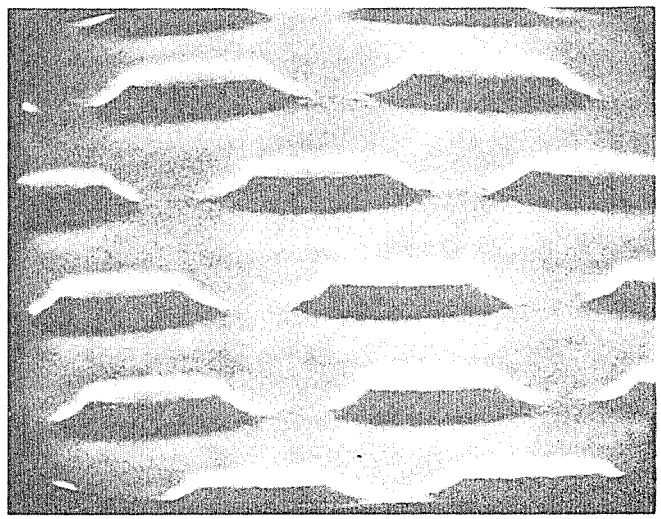
FIG. 2 is a photograph of the information track formed on a nickel stamper with magnification at 40 kX.

A microphotograph of a small portion of the surface of a nickel stamper is seen in FIG. 2, the view being taken along a radius of the disc close to the inner radius of the disc. It should be noted that, while the following discussion will be concerned with optically encoded discs and the replication thereof by an injection molding process using stampers with bumps projecting out of a planar surface, the invention is applicable to other geometrical forms for the information bearing surface, with the surface discontinuities in the form of pits projecting inwardly from the planar surface. The microphotograph of FIG. 2, of course, illustrates the "bump" configuration and shows the bumps with well defined and sharp edges, as well as a relatively flat upper surface. The sharp edges and abrupt surface changes referred to earlier can be observed in FIG. 2, and it is these physical characteristics of the pits or bumps which seem to contribute to the plowing phenomenon, and the sharper the edges the greater the influence on the extent of plowing in the replicas when they are separated from the stamper.

The introduction of chrome alleviates the problems associated with sharp edged pits or bumps on the nickel stamper. Moreover, the chrome plated stamper avoids the contribution to the "plowing effect" attributed to the surface characteristics of the nickel stamper hindering uniform flow and generating an unnecessary adhesive effect of the mold plastic on the stamper. The poor throwing power, i.e., nonuniform metal distribution, of the chrome plating bath allows a rounding off of the bumps. This reduces the sharp edges on the bumps and, in turn, reduce the amount of plowing. The smoother surface of the chrome also allows uniform flow of the mold plastic on the stamper, and the harder chrome surface is, of course, more durable than the nickel surface.

Figure 3:
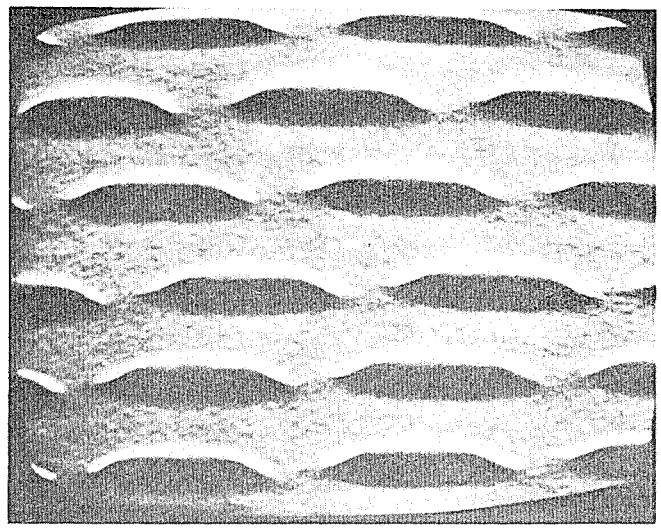
FIG. 3 is a photograph of the information track formed on a chrome plated nickel stamper with magnification at 40 kX.

FIG. 3 shows the same stamper as in FIG. 2 after chrome plating. While the planar surface between bumps appears to be grainer, the fact that the plated surface is of chromium material accounts for the "smoother" surface characteristic.

To carry out the chrome plating process, the already-prepared nickel stamper may be mounted to a cathode fixture (not shown) by any suitable fastening means. Anode bars, which may be a plurality of cylindrical bars of lead-antimony alloy (93%-7%), and the cathode fixture should be immersed with adequate coverage of these members by the chrome plating solution. The plating bath consists of an aqueous solution of chromium as $CrO_3$ and sulfate as $H_2SO_4$. The immersed stamper should be separated from the bottom of the tank and the solution surface by approximately five inches to have a uniform primary current distribution.

The sulfate concentration is adjusted until iridescent rings disappear and a faint bluish color appears on the stamper.

The nickel stamper is cleaned of any oil and any stripable protective coating residues from the mastering process by using an appropriate degreaser. The stamper is then placed in an alkaline cleaner and cathodically cleaned, rinsed, acid dipped, rinsed again, and then tightly secured so the stamper fixture. The stamper fixture is then immersed into the chrome solution attached securely to the cathode bar. Plating is then initiated for a given time, after which the stamper is removed from its fixture, rinsed thoroughly, and dried, preferably in a suitable vapor degreaser.

Various combinations of solution concentrations, temperatures, and current densities were tried starting with the suggested quantities of $CrO_3$ and $SO_4$ (from $H_2SO_4$). The best results were obtained with a $CrO_3$ to $SO_4$ ratio of 76 versus 100 according to recommended industrial specification. Temperature ranges were tried between 30° C. and 53° C., and concentration levels for the plating solution were found to be best when the concentration of $CrO_3$ was in the range of 4.0 to 35 grams per liter (g/L) and the concentration of $H_2SO_4$ was in the range of 0.05 to 0.5 g/L.

After evaluating several samples made with different combinations of process parameters, optimum process specifications for the flash plating of chromium on nickel stampers was developed. The chrome plating bath appears to be optimized with a composition of 33.5 ounces per gallon (oz/gal) or (4.44 gm/liter) of $CrO_3$ and 0.44 oz/gal (0.058 gm/liter) of $SO_4$, the $CrO_3$-to-$SO_4$ ratio being optimized at 76. The plating temperature was not critical, and optimum plating could be obtained in the temperature range of between 40° C. and 50° C. Using stampers having an outside diameter of 30 centimeters and an inside diameter of the opening of 8.9 centimeters, the area to be plated is calculated to be approximately 644 $cm^2$. With an optimum current density of 0.3–0.5 Amps/cm², the current required for plating the full surface of the stamper ranges from 195 to 325 Amps. Consistently good results were obtained with a full bath current of 210 Amps applied for 25 seconds.

FIG. 4 shows a partial cross-section of a stamper made in accordance with the present invention. The stamper 12 is comprised of a nickel stamper base 14 having a thickness in the range of 2 to 30 mils and is typically about 15 to withstand the pressure of injection molding. For illustrative purposes, the upper planar surface 16 of the stamper base 14 has projections 18, herein referred to as "bumps" which are on the order of 0.15 microns in height. The vacuum deposited nickel layer 20 is only a few Angstroms thick, recalling that the nickel vacuum deposited layer was necessary to support conductivity for the glass/photoresist master matrix from which the nickel stamper base 14 was produced.

In a test environment, set up to verify the signal recovery improvement using chrome plated stampers, a total of nineteen replicas were provided for examination. The replicas were all made from a transparent and impact modified polymethylmethacrylate plastic. Eleven were produced from a nickel stamper, and eight were produced from a chrome plated stamper. For comparative purposes, a selected group of the replicas were produced from a chrome plated stamper and others were produced from the same nickel stamper prior to chrome plating. The stampers used in the test were particularly chosen for their known propensity to produce plowing in the replicas.

When placed on a strong light table and viewed in a darkened room, 100% of the "pre-chromed" and "non-chromed" replicas exhibited glowing red patches identifiable as plowing. The patches were particularly prominent and extensive on the replicas made from the nickel stamper prior to chroming. The stronger patches also appeared slightly milky or opalescent when viewed in reflected light. By contrast, none of the replicas made from the same stamper after chrome plating showed any patches on the light table.

As confirmation that the elimination of plowing would render the replicas made therefrom more playable, an "audio noise at scan speed" test was devised. By operating a standard video disc player, such as the Discovision Associates PR-7820 player, in a modified playing mode, it was possible to create dot maps showing a distribution of dot patterns related to the extent and intensity of plowing surface stains. Various electronic signals produced by the player when operating in a special scan mode were monitored. The electronic interpretations shown in FIGS. 5A–B and 6A–B were made by running the left audio output, with squelch and dropout-compensation defeated, through a 100 KHz high-pass filter, and counting the fluctuations at the output of the player greater than ±3 millivolts. The player was operated in a slow forward scan mode. The disc was turned at normal speed, i.e. 1800 RPM, while the translation of the read beam across the disc required only about 2 minutes for a complete pass from the inner to the outer radius. The maps shown in the figures are all oriented in the same direction for comparative purposes. The truncation of the edges of the disc representations in the figures was due to the fact that the image scale was too large for the monitor used.

Figure 5B:
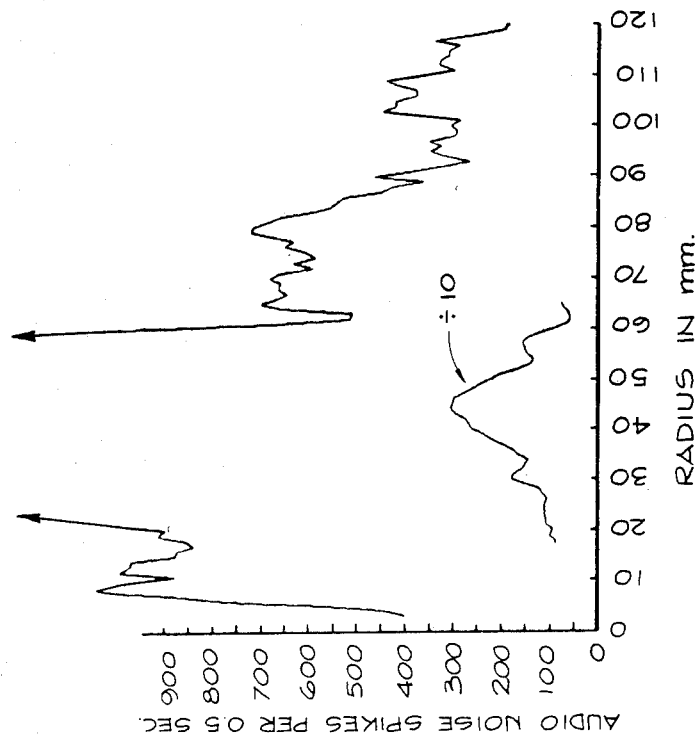
FIGS. 5A and 5B show the electronic interpretations of recovered audio noise from a replica tested at scan speed and produced from a nickel stamper.
Figure 5A:
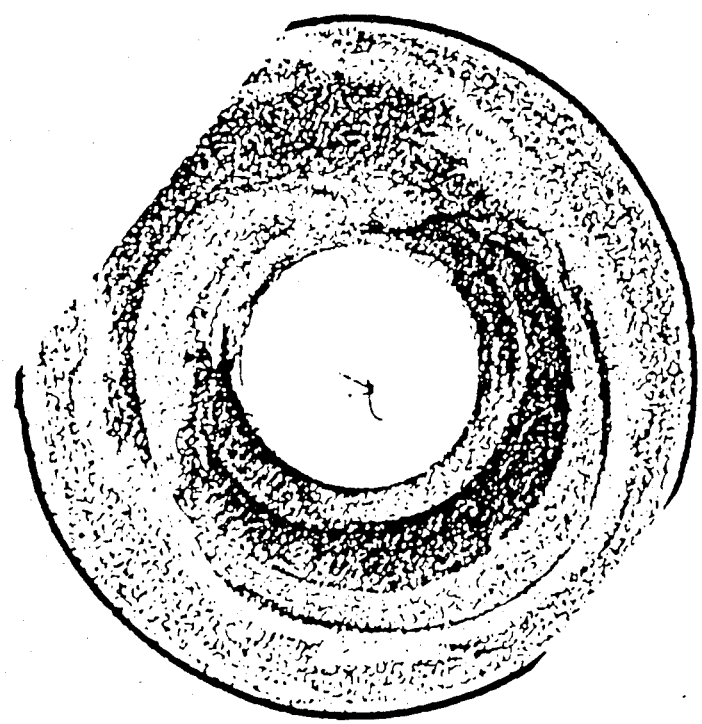
Figure 6B:
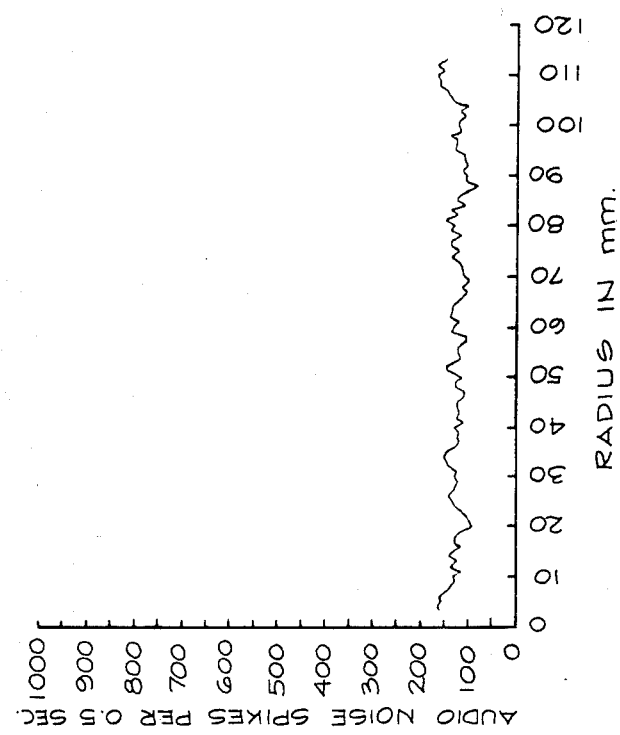
FIGS. 6A and 6B show the electronic interpretations of recovered audio noise from a replica tested at scan speed produced from a chromium surfaced stamper.
Figure 6A:
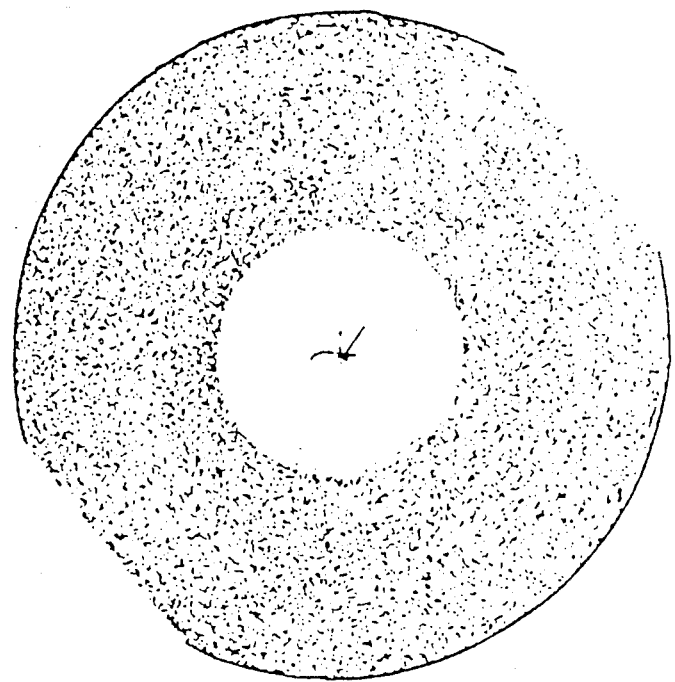

FIGS. 6A and 6B show the "audio noise test at scan speed" results using replicas made from the same stamper as those used to produce the replicas of FIGS. 5A and 5B after chrome plating. The rapid scan tests clearly corroborate the visual impression that the replicas produced after chrome plating exhibit far less stain than those produced before plating. Interestingly, the complicated stain pattern on the pre-chrome replica of FIG. 5A is remarkably consistent from disc-to-disc, and the areas of less-than-average stain around the major defects appear to be somewhat predictable as well. The patterns on the prechrome and non-chrome discs, however, appear to be somewhat variable, with some features intensifying and others diminishing, as successive replicas were made. On the other hand, by observing other "control" replicas made from a different stamper than those shown in FIG. 5, the patterns on the replicas produced by such different stamper had no obvious relationship to the pattern of FIG. 5. That is, using the same stamper, the plowing effect appeared to have a consistent pattern disc-to-disc, but no related pattern characteristics were noted in replicas made on different stampers. The example of FIG. 5 thus could not be termed "typical" insofar as the pattern of the defect is concerned, but is typical of the extent and kind of distribution that the plowing effect has in observing other replicas (not shown) submitted for evaluation. In any event, the improvement in the disc quality seen in FIGS. 6A and B is illustrative and characteristic of the use of chrome plated stampers.

Because only a finite number of dots are needed to produced a solid black area in the display, the maps of FIGS. 5A and 6A cannot always be depended upon to give an entirely accurate impression of the relative strengths in the different regions of the defect. Accordingly, a graphical representation of the plowing defect was created using the output from the modified disc player, the results shown in FIGS. 5B and 6B. Information for the graphs was gathered by counting the number of audio noise spikes occuring in each 0.5 second interval as the disc was scanned. The count per 0.5 seconds is shown on the ordinate axis of each graph, while the absissa axis shows radius of the disc in millimeters. It has been empirically determined that the best results for the graph plots of FIGS. 5B and 6B are obtained by using the output from the audio FM demodulater within the player unit. At this point in the electronics, the spikes are most easily separated from the program material, and a good representation of the plowing stain pattern can be extracted by passing this signal through a 10–50 KHz filter and counting the spikes exceeding ±0.45 volts.

A remarkable improvement in audio quality, i.e. lack of noise spikes, is evident from the comparison of the results of FIGS. 5B and 6B. For convenience, since the counts per 0.5 seconds in FIG. 5B were off the scale at the most dense region, a divide-by-10 plot is shown to indicate the peak noise spike count which, for this test sample, is about three thousand spikes per 0.5 seconds.

Figure 7B:
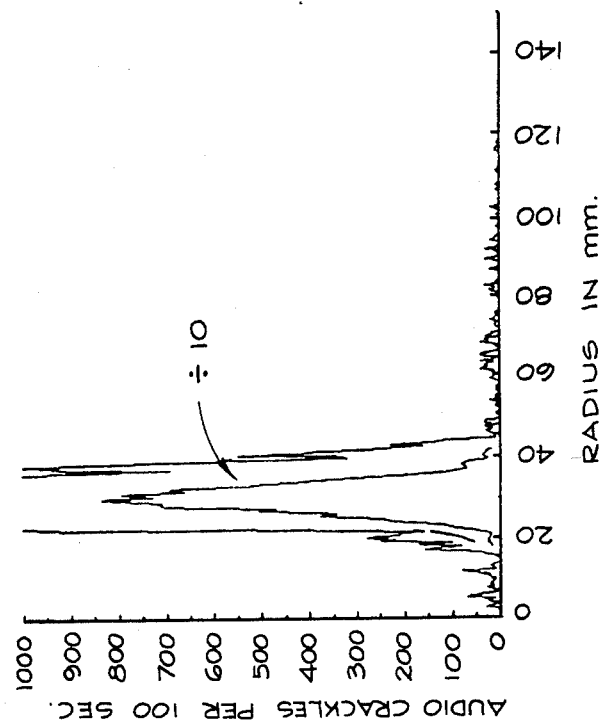
FIGS. 7A and 7B show the electronic interpretations of recovered audio crackle from a replica tested at normal play speed and produced from a nickel stamper.
Figure 7A:
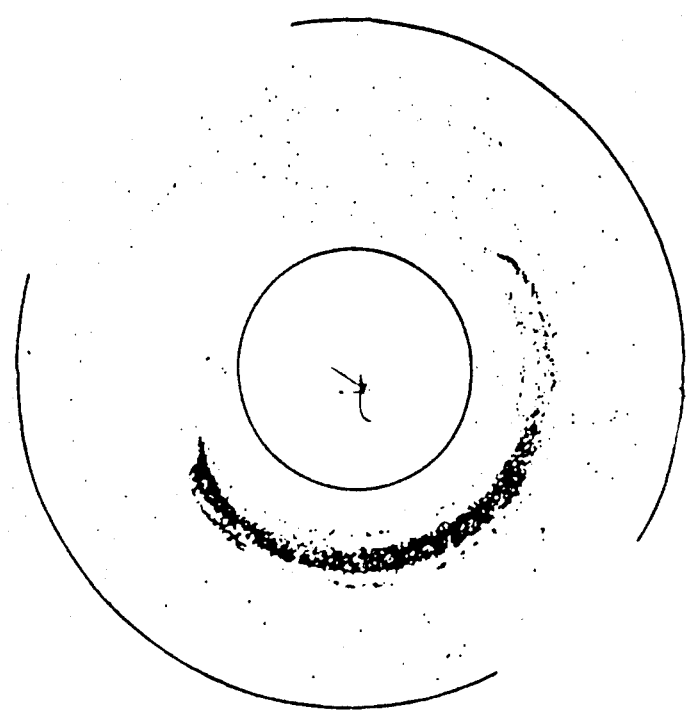
Figure 8B:
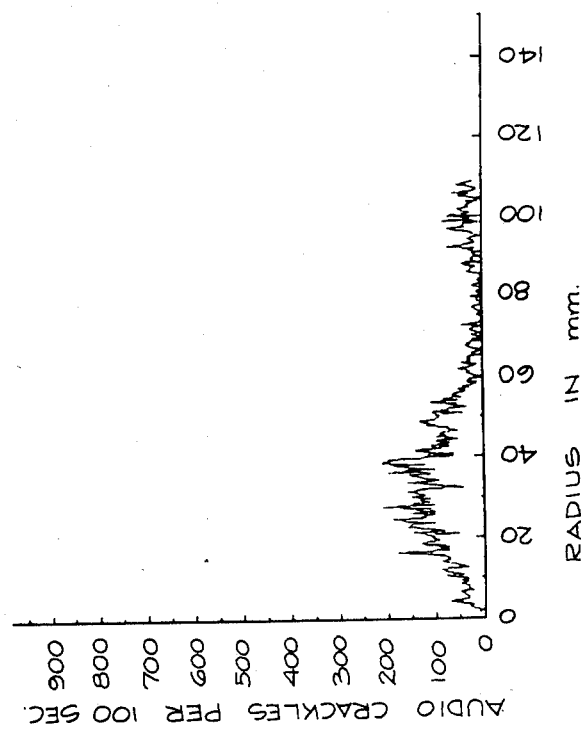
FIGS. 8A and 8B show the electronic interpretations of recovered audio crackle of a replica tested at normal play speed and produced from a chrome surfaced stamper.
Figure 8A:
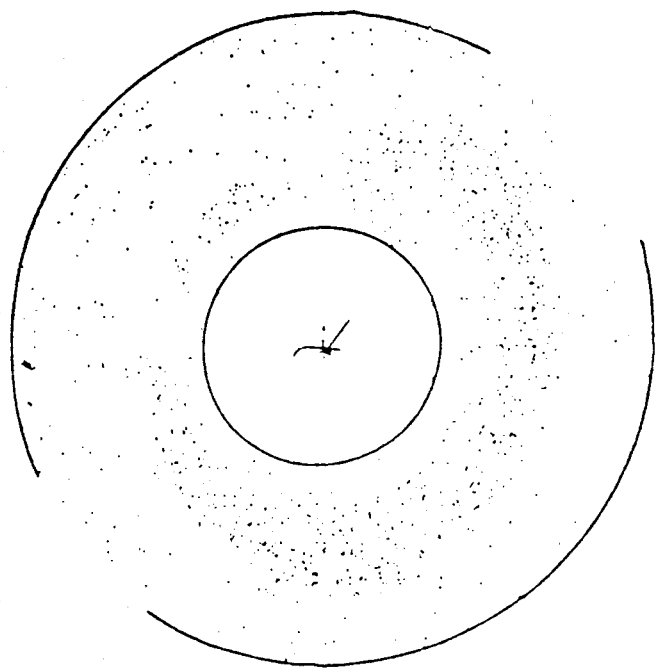
Figure 9B:
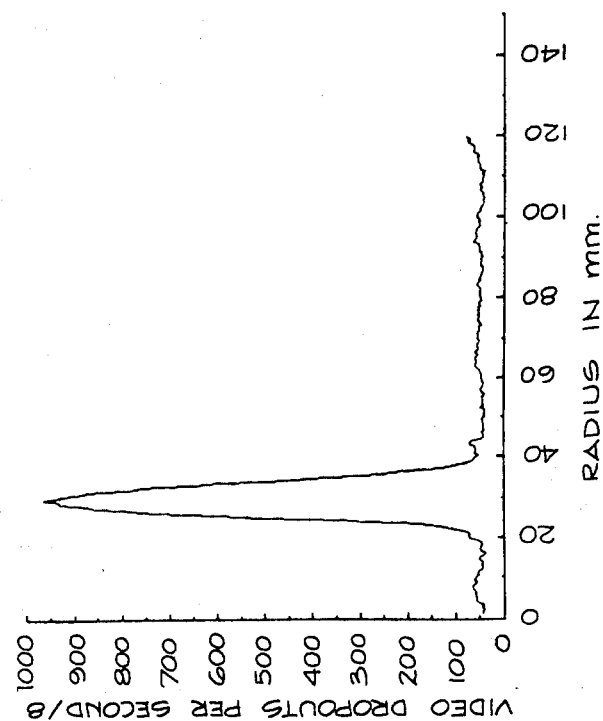
FIGS. 9A and 9B show the electronic interpretations of FM drop-outs of a replica produced from a nickel stamper.
Figure 9A:
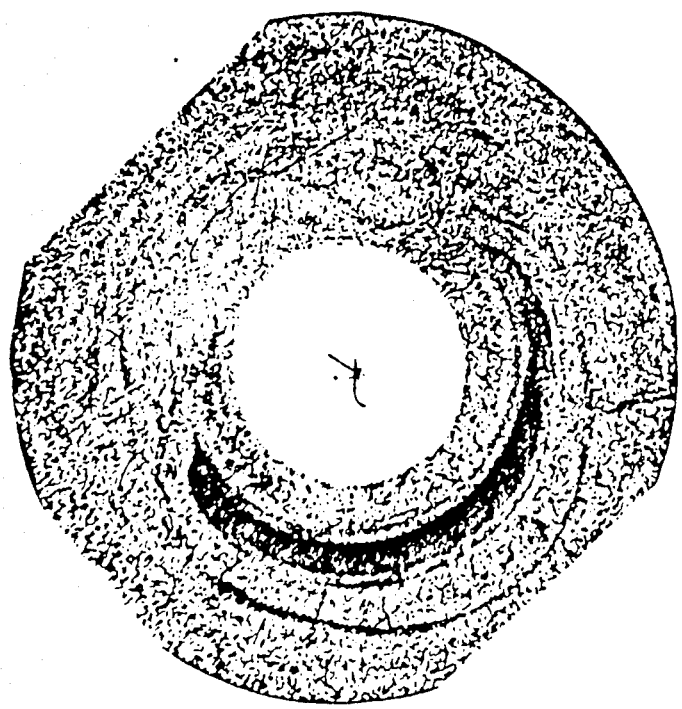
Figure 10B:
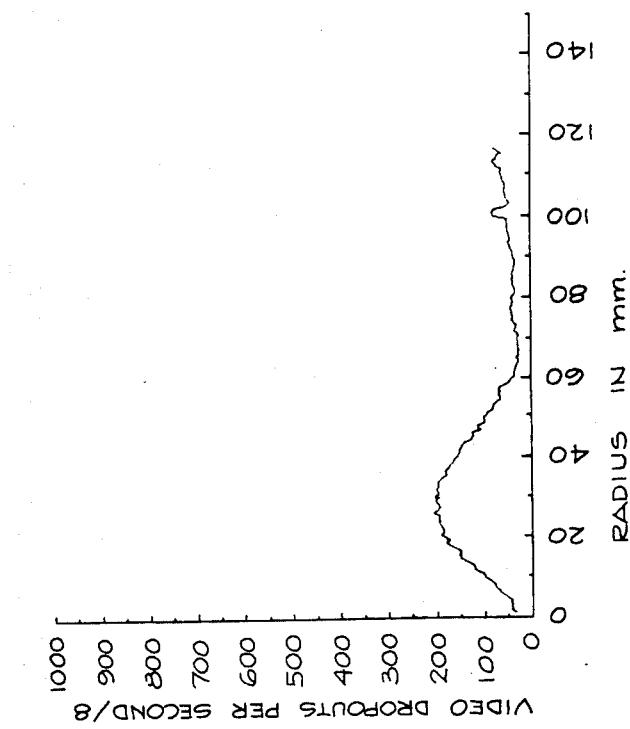
FIGS. 10A and 10B show the electronic interpretations of FM drop-outs of a replica produced from a chrome surfaced stamper.
Figure 10A:
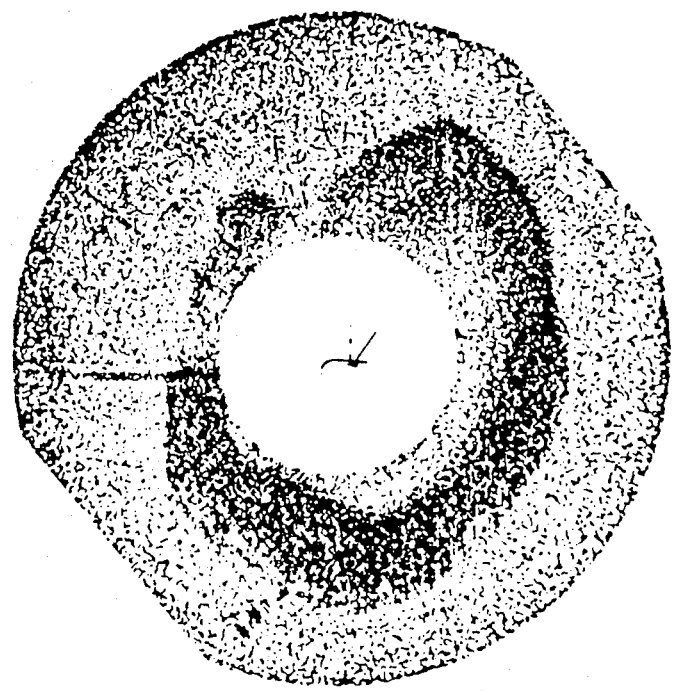

For comparative analysis, a second type of audio noise test was developed, referred to herein as the audio crackle test which is performed in the normal play mode of the player. The best results for the audio crackle test were found to be derived from the normal or final output of the player as opposed to the output of the FM demodulator which appeared to be best for certain scan speed analysis shown in FIGS. 5 and 6. FIGS. 7A–B and 8A–B thus show comparative test results using the audio crackle test at normal play speeds, FIGS. 7A and 8A showing the dot map display, while FIGS. 7B and 8B show the graphical representation which is similar to that of the corresponding plots shown in FIGS. 5B and 6B, with the exception that the number of audio crackles detected and displayed along the ordinate axis of FIGS. 7B and 8B are in terms of crackles per 100 seconds. Since the audio output of the player is used for audio crackle tests, in order to produce optimum results, the output of the player is passed through a 100 KHz high-pass filter, and residual spikes were observed which exceed ±3 mV.

As with the audio noise test at scan speeds, the audio crackle test in the normal play mode shows similar test results, and again the plot of FIG. 7B shows a divide-by-10 version of the results for convenience.

The audio noise and audio crackle tests indicate that in the area of the major cresent stain on the pre-chrome replica, about 20 to 30 times as many defects are counted per second as on the replica made from the same stamper after chrome plating. Observing that the counts accumulated for the particular test sample were strongly distributed on only about one-half of the disc in angle, it is apparent that the local defect density is even higher, i.e. at least 40 times that on the replica from the plated stamper.

The maps shown in FIGS. 5A and 7A indicate that only the strongest of the stains on the pre-chrome replica is associated with measurable crackle. Further, such crackles appear to be spread more or less uniformly over the area of the stain. The peak rate of crackle count is about 90 counts per second.

As a final comparative test, the discs were subjected to an analysis of FM dropouts, the results of which are shown in FIGS. 9A-B and 10A-B. FM dropouts are easily detected, since the player itself has been designed with a dropout compensation network to sense when dropouts occur and operates to substitute signal information in place of the areas of dropout to make the defect less noticeable. It is a simple matter to feed the output of the FM dropout detector to a threshold device such that when dropouts occur, the threshold level is exceeded, and a count pulse is outputted. For the evaluation of the test samples shown in the figures, a dropout is declared whenever no new zero-crossing of the FM signal recovered from the disc is detected for more than 100 nsec.

FM dropouts are typically more prevalent than indications of defective areas causing audio noise or audio crackle. Accordingly, although dropouts are observed in the normal play mode of the player, only a sampling of the dropout pulses developed by the player are used for defect evaluation. Alternatively, samples may be made in a mode in which the player is instructed to recover information from every second or third track, i.e. the read beam is jumped forward to skip a given number of tracks. The reason for this modified procedure is that the dropout rate on many replicas is so high that if all of the dropouts were plotted, a completely black and uninterpretable display would be obtained. The maps and graphs of FIGS. 9A-B and 10A-B show only one dropout out of every eight detected.

The worst dropout problems, with dropouts approaching 8,000 per second are found on the prechrome replica. This translates, using a frame rate of 30 frames per second, to approximately 260 dropouts per frame. The problem is mainly localized in the same strongly stained and crackly cresent that has been observed previously. The background rate over the rest of the disc, amounting to about 15 counts per frame, is also rather high.

As was observed with the crackles, the replicas produced by the chrome plated stamper has greatly supressed dropout rate in the original problem area, but at the same time the distribution is somewhat more spread out so that the bordering areas of the originally noted defective area are actually noisier than they were on the original stamper. Although less severe than the original problem, the peak rate of about 50 dropouts per frame (1,600 per second) is on the borderline of being acceptable. However, as previously mentioned, the stamper used in this analysis was chosen for its large and above-normal intensity of defected area, and stampers having typically, less intense and wider distributed stained regions show that, when considering the average dropout rate, the "chrome" replica is far better than the "pre-chrome" replica.

Figure 12:
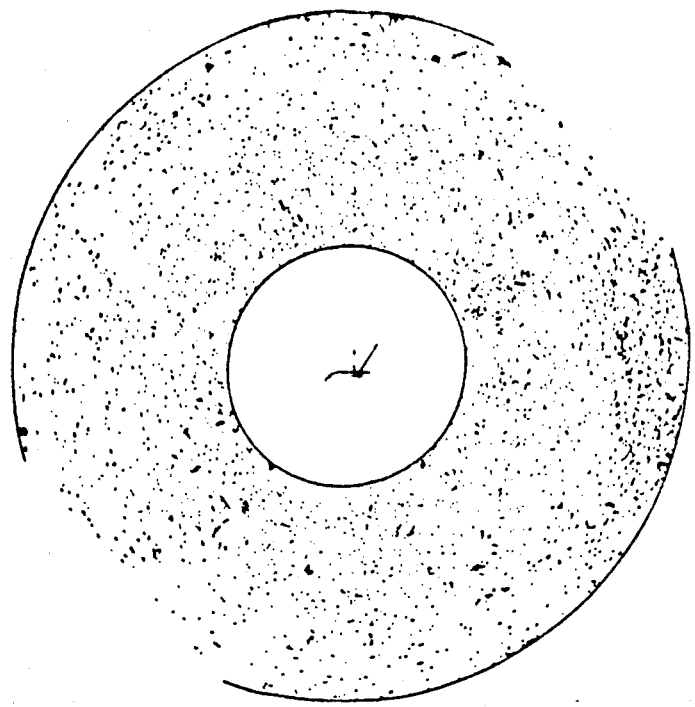
FIG. 12 is the electronic interpretation of "orange peel" of a replica produced from a chrome surfaced stamper.
Figure 11:
FIG. 11 is the electronic interpretation of "orange peel" of a replica produced from a nickel stamper.

Visual inspection of the replicas submitted for evaluation revealed the presense of orange peel within part of the most strongly stained area on the replicas made from the pre-chrome stamper, as well as peripheral areas not contributing to the plowing effect. Electronically, the magnitude of the orange peel can be evaluated by measuring the error signal on the tracking servo board of the player. The orange peel on the replicas tested prove to be not overly severe (tracking errors of less than ±2 volts). Dot maps were developed using replicas before and after chrome plating, the dot pattern being developed by sensing the tracking error signal. Points at which the tracking error exceeded ±1 volt were printed on the display while running the discs at the normal constant rotational speed of 1800 RPM. The results are shown in FIGS. 11 and 12, FIG. 11 being the pre-chrome replica and FIG. 12 showing the lack of orange peel in the replica produced by the same stamper after chrome plating. Thus, it can be concluded that the orange peel effect is reduced and therefore the trackability improved after chrome plating the nickel stamper.

In summary, examination of the replicas provided for analysis comprising examples made from a problem stamper before and after chrome plating, revealed that the chrome plating resulted in a dramatic visual improvement in the amount of plowing stain. The visual improvement can be confirmed electronically by plotting and counting high-frequency audio noise with the player operating in the slow scan forward mode. The original problem stamper produced replicas which exhibited intense dropouts and audio crackle in one of the "plowed" areas. "Orange peel" was observed nearby, but not identically coincident with the main problem area. The peak rates of both crackle and dropouts were much reduced by the chrome plating process, the crackle by a factor of about 27, and the dropouts by a factor of about 5. Around the former peak area (of the nickel stamper replica), the crackle and dropout rates from the chrome-plated stamper were enhanced over what they had been before plating. Total dropouts, however, are not reduced by a large factor, but are more evenly distributed over the surface of the replica. Total crackles are improved by a factor of about seven.

While the invention has been particularly shown and described with reference to the preferred embodiment thereof, it will be understood by those skilled in the art that changes in form and details may be made therein without departing from the spirit and scope of the invention. Accordingly, it is not intended that the invention be limited except as by the appended claims.

I claim:

1. A method for producing an improved metallic stamper against which an optically-readable information bearing member may be formed, comprising the steps of:
   preparing an information bearing surface on a substrate having the information contained therein in the form of surface discontinuities;
   vacuum depositing a conductive coating over the information bearing surface of the substrate of sufficient thickness to be conductive over the entire information bearing surface;
   electroplating nickel material onto said conductive coating, thereby forming a relatively thick nickel stamper base having an information bearing surface complementary to that of said substrate;
   separating the nickel stamper from the substrate; and
   depositing, by electroplating in an electrolyte bath, a relatively thin layer of chromium over said complimentary information bearing surface of said stamper base, said depositing step including the steps of:
   maintaining the electrolyte bath temperature at 40° C. to 50° C.;
   establishing a current density within the electroplating bath in the range of 0.250 to 2.00 amps/cm$^2$; and
   performing said depositing step for a time in the range of 10 to 40 seconds.

2. The method as claimed in claim 1, wherein the nickel stamper base has a thickness in the range of 2 to 30 mils, and said depositing step includes depositing the layer of chromium to a thickness of approximately 500 Angstroms.

3. A method for producing an improved metallic stamper against which an optically-readable information bearing member may be formed by injection molding, comprising the steps of:
   Preparing an information bearing surface on a substrate having the information contained therein in the form of surface discontinuities;
   depositing a relatively thick layer of stamper material onto said information bearing surface, thereby forming a stamper base having an information bearing surface complementary to that of said substrate and of a hardness sufficient to withstand the mold pressures associated with injection molding;
   separating the stamper base from the substrate; and
   depositing, by electroplating in an electrolyte bath, a relatively thin layer of chromium over said complementary information bearing surface of said stamper base, said chromium depositing step including the steps of:
   maintaining an electrolyte bath temperature of 40° C. to 50° C.;
   establishing a current density within the electroplating bath in the range of 0.250 to 2.00 amps/cm$^2$; and
   performing said depositing step for a time in the range of 10 to 40 seconds.

4. The method as claimed in claim 3 wherein the stamper base has a thickness in the range of 2 to 30 mils, and said chromium depositing step includes depositing the layer of chromium to a thickness of approximately 500 Angstroms.

5. A method for producing an improved metallic stamper against which an optically-readable information bearing member may be formed, comprising the steps of:
   preparing an information bearing surface on a substrate having the information contained therein in the form of surface discontinuities;
   vacuum depositing a conductive coating over the information bearing surface of the substrate of sufficient thickness to be conductive over the entire information bearing surface;
   electroplating nickel material onto said conductive coating, thereby forming a relatively thick nickel stamper base having an information bearing surface complementary to that of said substrate;
   separating the nickel stamper from the substrate; and
   depositing, by electroplating in an electrolyte bath, a relatively thin layer of chromium over said complementary information bearing surface of said stamper base, the starting materials for said electrolyte bath including: chromium in the form of $CrO_3$ in the range of 4.0 to 35 g/L; $H_2SO_4$ in the range of 0.05 to 0.5 g/L; and the remainder distilled water.

6. A method for producing an improved metallic stamper against which an optically-readable information bearing member may be formed, comprising the steps of:
   preparing an information bearing surface on a substrate having the information contained therein in the form of surface discontinuities;
   vacuum depositing a conductive coating over the information bearing surface of the substrate of sufficient thickness to be conductive over the entire information bearing surface;
   electroplating nickel material onto said conductive coating, thereby forming a relatively thick nickel stamper base having an information bearing surface complementary to that of said substrate;
   separating the nickel stamper from the substrate; and
   depositing, by electroplating in an electrolyte bath, a relatively thin layer of chromium over said complementary information bearing surface of said stamper base, the starting materials for said electrolyte bath including: chromium in the form of $CrO_3$ in the range of 4.0 to 35 g/L; $H_2SO_4$ in the range of 0.05 to 0.5 g/L; and the remainder distilled water; and wherein
   said depositing step includes the steps of:
   maintaining an electrolyte bath temperature of 40° C. to 50° C.;
   establishing a current density within the electroplating bath in the range of 0.250 to 2.00 amps/cm$^2$; and
   performing said depositing step for a time in the range of 10 to 40 seconds.

7. A method for producing an improved metallic stamper against which an optically-readable information bearing member may be formed by injection molding, comprising the steps of:
   preparing an information bearing surface on a substrate having the information contained therein in the form of surface discontinuities;
   depositing a relatively thick layer of stamper material onto said information bearing surface, thereby forming a stamper base having an information bearing surface complementary to that of said substrate and of a hardness sufficient to withstand the mold pressures associated with injection molding;
   separating the stamper base from the substrate; and depositing, by electroplating in an electrolyte bath, a relatively thin layer of chromium over said complementary information bearing surface of said stamper base, the starting materials for said electrolyte bath including: chromium in the form of $CrO_3$ in the range of 4.0 to 35 g/L; $H_2SO_4$ in the range of 0.05 to 0.5 g/L; and the remainder distilled water.

8. A method for producing an improved metallic stamper against which an optically-readable information bearing member may be formed by injection molding, comprising the steps of:

preparing an information bearing surface on a substrate having the information contained therein in the form of surface discontinuities;

depositing a relatively thick layer of stamper material onto said information bearing surface; thereby forming a stamper base having an information bearing surface complementary to that of said substrate and of a hardness sufficient to withstand the mold pressures associated with injection molding;

separating the stamper base from the substrate; and depositing, by electroplating in an electrolyte bath, a relatively thin layer of chromium over said complementary information bearing surface of said stamper base, the starting materials for said electrolyte bath including: chromium in the form of $CrO_3$ in the range of 4.0 to 35 g/L; $H_2SO_4$ in the range of 0.05 to 0.5 g/l; and the remainder distilled water; and wherein said chromium depositing step includes the steps of:

maintaining an electrolyte bath temperature of 40° C. to 50° C.;

establishing a current density within the electroplating bath in the range of 0.250 to 2.00 amps/$cm^2$; and performing said depositing step for a time in the range of 10 to 40 seconds.

* * * * *

UNITED STATES PATENT AND TRADEMARK OFFICE
CERTIFICATE OF CORRECTION

PATENT NO. : 4,500,392

DATED : February 19, 1985

INVENTOR(S) : Gary G. Slaten

It is certified that error appears in the above—identified patent and that said Letters Patent are hereby corrected as shown below:

Column 4, after line 62, insert --FIG. 4A is a detailed view of the circled area of FIG. 4B.--.

Column 4, line 63, "FIG. 4" should be --FIG. 4B--.

Column 7, line 6, "FIG. 4 shows" should be --FIGS. 4A and FIG. 4B show--.

Column 7, line 19, after "duced." insert --the numeral 21 designates a chromium layer.--.

Signed and Sealed this

Fifth Day of November 1985

[SEAL]

Attest:

Attesting Officer

DONALD J. QUIGG

Commissioner of Patents and Trademarks